United States Patent [19]

Crannage

[11] Patent Number: 5,332,072
[45] Date of Patent: Jul. 26, 1994

[54] STRUT ASSEMBLIES
[75] Inventor: Mark A. Crannage, Somerton, England
[73] Assignee: Westland Helicopters Limited, England
[21] Appl. No.: 970,826
[22] Filed: Nov. 3, 1992
[30] Foreign Application Priority Data
Nov. 13, 1991 [GB] United Kingdom ............... 9124081
[51] Int. Cl.$^5$ ............................................. F16F 7/10
[52] U.S. Cl. ............................ 188/378; 188/372; 244/17.19
[58] Field of Search ............... 188/371, 372, 376, 377, 188/378, 299, 322.19; 267/64.16; 280/707; 244/17.19

[56] References Cited
U.S. PATENT DOCUMENTS

| | | | |
|---|---|---|---|
| 3,078,967 | 2/1963 | Brown et al. | 267/64.25 |
| 3,477,665 | 11/1969 | Legrand | 244/17.25 |
| 4,336,868 | 6/1982 | Wilson et al. | 188/376 |
| 4,361,212 | 11/1982 | Bolang et al. | 188/377 |
| 4,819,182 | 4/1989 | King et al. | 364/508 |
| 5,070,970 | 12/1991 | Johnston et al. | 188/322.19 |
| 5,080,392 | 1/1992 | Bazergui | 280/707 |

FOREIGN PATENT DOCUMENTS

| | | | |
|---|---|---|---|
| 1087716 | 4/1984 | U.S.S.R. | 188/377 |
| 1182339 | 8/1967 | United Kingdom . | |
| 2160840 | 1/1986 | United Kingdom . | |

Primary Examiner—Robert J. Oberleitner
Assistant Examiner—Chris Schwartz
Attorney, Agent, or Firm—Larson & Taylor

[57] ABSTRACT

A strut assembly includes an axially elastically deformable tube assembly comprising a plurality of nested concentric tubes arranged in series and an axially extensible actuator attached between the ends of the tube assembly so that reciprocal extensions of the actuator cause elastic longitudinal displacements of the strut assembly. The tubes are rigidly fixed to one another.

6 Claims, 1 Drawing Sheet

STRUT ASSEMBLIES

BACKGROUND OF THE INVENTION

1. Field of the Invention

This invention relates to strut assemblies and particularly to strut assemblies for interconnecting parts of a structure for transmitting operational loads and for introducing forcing loads as part of an active vibration reducing system.

2. Description of the Prior Art

GB-A-2160840 describes an active vibration reducing system in which a plurality of force actuators are connected at or across locations between parts of a structure which are capable of relative movement at dominant vibrating forcing frequencies. A number of sensors measure the vibration response at key locations on the structural part in which vibration is to be reduced and the resulting signals are fed to an adaptive computer/controller which provides optimal signals to the actuators to produce forces at the sensor locations in the structural part. The actuators are powered by pulsed fluid supplies, preferably hydraulic supplies.

In such a system it is essential that the interconnected parts of the structure possess different stiffness and mass characteristics so that actuator forces are reacted by the part having the greater stiffness and mass to impart movement to the other part of the structure having the lower stiffness and mass and in which vibration is to be reduced.

The aforementioned vibration reducing system is particularly suited for use in helicopters in that a fuselage structure in which it is desired to reduce vibration is generally constructed to be lightweight and flexible and is attached beneath a gearbox and rotor structure that has a high mass and is constructed to be as rigid as possible. Not surprisingly then, an exemplary embodiment of GB-A-2160840 envisages connecting the force actuators between the gearbox and the fuselage although it is clear that other locations are possible. Furthermore, whilst such a system, known as a dual point actuation system, has been used the actuators can alternatively be connected between the fuselage structure at one point and a seismic mass to generate the required forcing. Such a system is termed a single point actuation system.

The system of GB-A-2160840 has been demonstrated on the Westland 30 helicopter and that installation is described in a paper presented at the 15th European Rotorcraft Forum in September 1989 titled "An evaluation of active control of structural response as a means of reducing helicopter vibration". In the Westland 30 the gearbox and rotor are mounted on a raft connected to the fuselage by four elastomeric units which provided an ideal location for the force actuators, and four electro-hydraulic actuators were incorporated in modified elastomeric units in which the actuators operate in parallel with the elastomer spring. Such a system of force actuators is however not widely applicable since in many helicopters the gearbox is attached directly to lift frame members in the fuselage either through a plurality of gearbox mounting feet or a plurality of external angled strut assemblies.

Such a strut assembly is disclosed for use with one embodiment of a prior single input/single output vibration reducing system that is the subject of GB-A-1182339. Thus, FIG. 7 of that specification discloses a strut assembly incorporating an electro-hydraulic jack straddling a metallic oblate elastic ring which in operation is required to transmit primary lift and manoeuvring loads whilst also permitting the jack to input forcing loads to reduce vibration.

Problems with the prior strut assembly are that the oblate elastic ring represents an inefficient primary load path and it is difficult to tailor the bending loads in the ring to suit operational requirements in respect of both mechanical strength and elastic properties. The elastic ring requires a large space envelope and is bulky and heavy which may also frustrate installation in some applications.

These problems would be multiplied in attempting to utilise the strut assembly of GB-A-1182339 in the more sophisticated vibration reducing system of GB-A-2160840 because of the necessity for a plurality of jacks all inputting forcing loads simultaneously.

The strut assembly disclosed in our co-pending European Patent Application No. 92301331.2 (EP-A-0501658) overcomes these problems by locating an actuator axially within an axially elastically extensible tube provided with attachment means at both ends. However, in installations in which the available space restricts the overall length of our prior strut assembly it may not be possible to obtain a desired axial elastic extension of the tube without an unacceptable reduction in the thickness of the wall of the tube which could adversely affect its required strength in the primary load path.

An objective of this invention is therefore to provide a strut assembly which overcomes these problems.

SUMMARY OF THE INVENTION

Accordingly, in one aspect, this invention provides a strut assembly for interconnecting two parts of a structure for transmitting operational loads between the parts and for inputting periodic loads to at least one of said parts, said strut assembly comprising an axially elastically deformable tube assembly having attachment means at each end for attaching said strut between said parts and an axially extensible actuator attached within the tube assembly between its ends, the axial stiffness of the tube assembly being selected so that reciprocal extensions of the actuator cause elastic longitudinal displacements of the strut assembly to input said periodic loads, wherein said tube assembly comprises a plurality of nested concentric tubes arranged in series.

In one embodiment said tube assembly may comprise an outer tube, an intermediate tube and an inner tube. One end of the outer tube may be attached to one of said attachment means and its other end may be attached to one end of the intermediate tube which extends concentrically within said outer tube with its other end attached to one end of the inner tube which extends concentrically within said intermediate tube with its other end attached to the other of said attachment means.

The actuator may include an actuator housing attached to one end of said tube assembly and an actuator ram extending co-axially within the tube assembly and attached to the other end of said tube assembly.

Conveniently said actuator housing maybe formed integral with one of said attachment means and the actuator ram may be formed integral with the other of said attachment means.

The actuator may comprise an electro-hydraulic actuator.

In another aspect this invention provides a strut assembly for connecting a gearbox to a helicopter fuselage for transmitting flight loads from the gearbox to the fuselage and for inputting periodic forcing loads into the fuselage as part of an active vibration control system, the strut assembly comprising an axially elastically extensible tube assembly having attachment means at its ends for attachment respectively to said gearbox and said fuselage and an axially extensible actuator attached co-axially within the tube assembly between the attachment means, the axial stiffness of the tube assembly being selected to be capable of transmitting operational loads and so that reciprocal extensions of the actuator cause elastic longitudinal displacements of the strut assembly to input said periodic loads, wherein said tube assembly comprises a plurality of nested concentric tubes arranged in series between said attachment means.

BRIEF DESCRIPTION OF THE DRAWINGS

The invention will now be described byway of example only and with reference to the accompanying drawings in which.

DETAILED DESCRIPTION OF THE DRAWINGS

Figure 1:
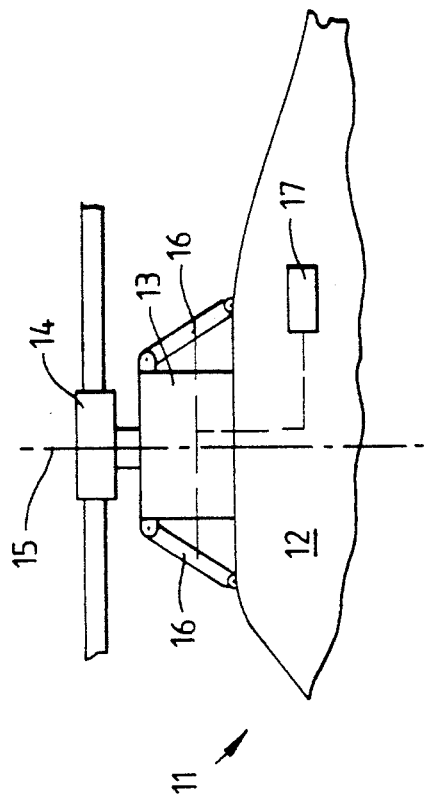
FIG. 1 is a generally schematic fragmentary side view of a helicopter incorporating a plurality of strut assemblies constructed according to this invention.

Referring now to FIG. 1, a helicopter generally indicated at 11 has a fuselage 12 carrying a gearbox 13 driving a main sustaining rotor 14 about a generally vertical axis 15. Gearbox 13 is supported from the fuselage 12 by four strut assemblies 16 (two only being shown) attached between the gearbox 13 and fuselage 12.

Each of the strut assemblies 16 transmits primary flight and manoeuvring loads from the gearbox 13 to the fuselage 12. In addition each of the strut assemblies 16 incorporates an electro-hydraulic actuator as hereinafter described, the actuators being connected to a controller 17 of an active vibration control system for inputting periodic forcing loads into the fuselage structure as described in the aforementioned GB-A-2160840.

Figure 2:
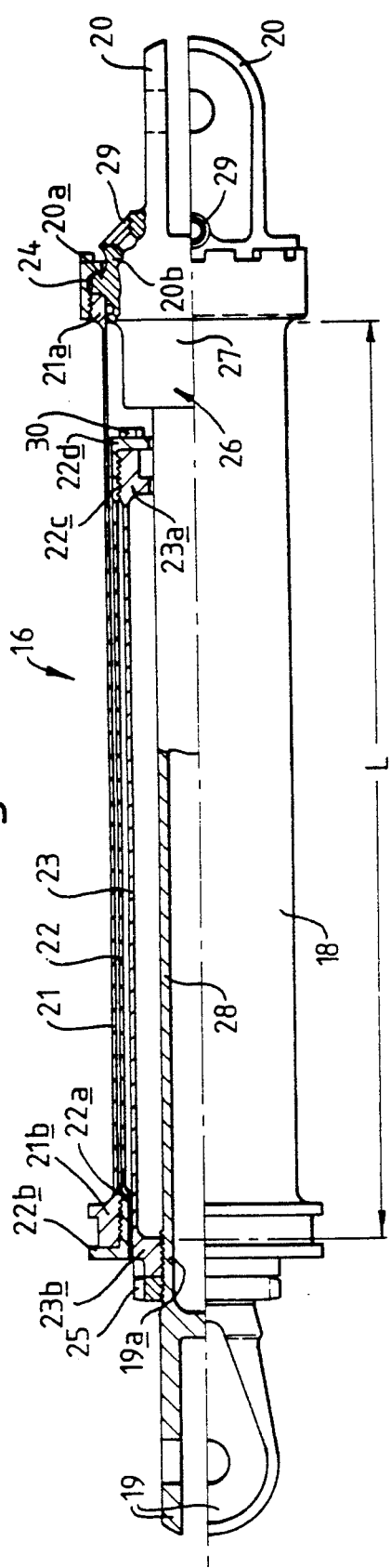
FIG. 2 is a longitudinal part sectioned view of one of the strut assemblies in which the upper half of the figure is rotated through 90 degrees abut its longitudinal axis compared to the bottom half.

As shown in FIG. 2, each strut assembly 16 comprises an axially elastically extensible tube assembly 18 having an apertured attachment fitting 19 at one end for attachment to the gearbox 13, and an apertured attachment fitting 20 at its other end for attachment to the fuselage structure 12.

Tube assembly 18 comprises three nested concentric tubes 21, 22, 23 arranged axi-symmetrically in series between the attachment fittings 19 and 20. Thus, outer tube 21 has a thickened externally threaded end 21a locked to an externally threaded radial flange 20a on a body portion 20b formed integral with attachment fitting 20 by an internally threaded castellated locking ring 24.

The other end 21b of outer tube 21 is thickened locally and has internal threads engaged in external threads formed on a thickened end 22a of intermediate tube 22. A radial surface of end 21b is locked against an adjacent surface of a radial flange portion 22b formed on intermediate tube 22. Tube 22 extends inwardly within outer tube 21 and terminates at an internally threaded thickened end 22c having a radially inwardly extending flange portion 22d. An externally threaded thickened end 23a of inner tube 23 is threadably engaged with end 22c and abuts an inner surface of flange 22d. Threaded lock pins 30 serve to lock the ends 22d and 23a.

Inner tube 23 extends within intermediate tube 22 and has an internally threaded thickened end 23b threadably engaged on an externally threaded body portion 19a integral with attachment fitting 19. The parts are locked by an internally threaded locknut 25.

An electro-hydraulic actuator 26 is located axially within the strut assembly 16 and comprises an actuator housing 27 and an axially extending actuator ram 28. In the illustrated embodiment, actuator housing 27 is formed integral with body portion 20b of attachment fitting 20, and ram 28 is formed integral with body portion 19a of attachment fitting 19. Actuator housing 27 includes an axially movable piston 30 located in a chamber (not shown) supplied during operation with pulsed hydraulic fluid supplies through hydraulic inlet and outlet ports 29 (one only being shown), and the piston is in abutting operative relationship with an end of the actuator ram 28. The pulsed hydraulic fluid supply is controlled by electrically operated valve means (not shown) upstream of the actuator 16 and operated by electrical control signals from controller 17 (FIG. 1).

In one embodiment, the tubes 21, 22 and 23 are manufactured from titanium alloy and the stiffness characteristics are determined for each particular application. Thus, the tube assembly 18 has sufficient mechanical strength to ensure that the strut assembly 16 provides adequate support between the helicopter and the gearbox to sustain the lift and manoeuvring loads emanating from the sustaining rotor 14. In addition the tube assembly 18 provides appropriate axial elastic flexibility such that the actuator 26 mounted in parallel and signalled from controller 17 of the active vibration control system can input the displacements to introduce the required forcing loads into the strut assembly 16 by axial elastic deformation of the tube assembly 18 to control the dynamic response of the fuselage 12 in the manner disclosed in GB-A-2160840.

The use of a plurality of nested tubes in series in the construction of the tube assembly 18 enables achievement of these operational properties in a minimised space envelope by significantly increasing an effective working length of the strut assembly 16 within a working length L (FIG. 2) dictated by installation considerations. For example, in one embodiment the length L is abut 400 mm maximumand the nested tube arrangement of this invention provides an effective length of over 900 mm. This more than doubling of the working length L means that for a given stiffness requirement and axial elastic extension requirement (typically abut 0.5 mm), the strut assembly of the illustrated embodiment of this invention requires less than half the installed length of our prior strut assembly. Moreover, for a given working length L, the wall thickness of the nested tubes 21, 22 and 23 of this invention can be double that which could be used in the single tube arrangement of our prior strut assembly.

The thickened end portions of the nested tubes 21, 22 and 23 are effective in reducing undesirable local toroidal bending deflections and stresses in the tubes under load conditions.

The strut assembly 16 of this invention provides a simple, compact and lightweight device. The use of an axially elastically deformable tube assembly 18 in parallel with the actuator 26 provides an efficient primary load path and can be readily tailored to provide optimum mechanical strength and elastic properties.

Although described herein in respect of its application as part of a vibration reducing system on a helicopter, the strut assembly 16 of this invention can be used to good effect in other installations incorporating active vibration reducing systems. For example the strut assembly 16 could be used to support the engines in the engine bays of fixed wing aircraft to reduce fuselage vibration as well as in land or sea vehicles or in fixed installations. Furthermore, the strut assembly 16 of this invention can be used in both dual point and single point actuation systems and in the latter type systems, the seismic mass comprises one of the two structural parts interconnected by the strut assembly 16.

Whilst one embodiment of the invention has been described and illustrated it will be understood that many modifications may be made without departing from the scope of the invention as defined in the appended claims. For example, other suitable materials including fibre-reinforced materials may be used in the manufacture of the axially elastically deformable tube assembly 18. The housing 27 and actuator ram 28 of actuator 26 can be separate from the respective attachment fittings 19 and 20, and the actuator 26 can be of any suitable type. Stabilising means may be located in the spaces between the adjacent ends of the respective tubes 21, 22 and 23 and may comprise a layer of elastomer material or an elastomeric bearing device. The tube assembly 18 can comprise any suitable number of nested tubes greater than two tubes, and any suitable means of attachment having required structural integrity characteristics such as bonding, welding, bolting, etc., can be used in place of the threaded attachments between the tubes 21, 22, and 23 of the illustrated embodiment. It may be desirable depending on the material from which the tube assembly 18 is constructed to provide an external protective coating such as a coating of polyurethane to prevent damage during operation.

What is claimed is:

1. A strut assembly for interconnecting two parts of a structure for transmitting operational loads between the parts, and for inputting periodic forcing loads into at least one of the parts as part of an active vibration control system, said strut assembly including an axially elastically deformable tube assembly comprising a plurality of nested concentric tubes arranged in series, and each tube rigidly attached to one end of an adjacent tube for a rigid attachment respectively to said parts and an axially extensible actuator rigidly fixed co-axially within and to the tube assembly between said parts, the tubes being manufactured from material having mechanical strength and elastic properties selected to provide a predetermined axial stiffness capable of transmitting operational loads and so that reciprocal axial extensions of the actuator cause elastic longitudinal displacements of the strut assembly to input said periodic loads.

2. A strut assembly as claimed in claim 1, wherein said tube assembly comprises an outer tube, an intermediate tube and an inner tube.

3. A strut assembly as claimed in claim 2, wherein one end of the outer tube is attached to one of said parts and its other end is attached to one end of the intermediate tube which extends concentrically within the outer tube with the other end of the intermediate tube attached to one end of the inner tube which extends concentrically within the intermediate tube with the other end of the inner tube attached to the extensible actuator.

4. A strut assembly as claimed in claim 1, wherein said actuator includes an actuator housing attached to one end of said tube assembly and an actuator ram extending co-axially and attached to the other end of said tube assembly.

5. A strut assembly as claimed in claim 1, wherein said actuator is an electro-hydraulic actuator.

6. A strut assembly for connecting a gearbox to a helicopter fuselage for transmitting flight loads from the gearbox to the fuselage and for inputting periodic forcing loads into the fuselage as part of an active vibration control system, said strut assembly including an axially elastically extensible tube assembly comprising a plurality of nested concentric tubes arranged in series, and each tube rigidly attached to one end of an adjacent tube for a rigid attachment respectively to said gearbox and said fuselage and an axially extensible actuator rigidly affixed co-axially within and to the tube assembly between the gearbox and the fuselage, the tubes being manufactured from material having mechanical strength and elastic properties selected to provide a predetermined axial stiffness capable of transmitting operational loads and so that reciprocal axial extensions of the actuator cause elastic longitudinal displacements of the strut assembly to input said periodic loads.

* * * * *